Sept. 1, 1931.  D. L. GALLUP  1,821,149

BRAKE SHOE CONNECTING MEANS

Filed March 12, 1928

INVENTOR
David L. Gallup
BY
M. W. McConkey
ATTORNEY

Patented Sept. 1, 1931

1,821,149

UNITED STATES PATENT OFFICE

DAVID L. GALLUP, OF SOUTH BEND, INDIANA, ASSIGNOR TO BENDIX BRAKE COMPANY, OF SOUTH BEND, INDIANA, A CORPORATION OF ILLINOIS

BRAKE SHOE CONNECTING MEANS

Application filed March 12, 1928. Serial No. 260,858.

This invention relates to adjusting or connecting devices, and is illustrated as embodied in a novel device for adjusting an internal expanding automobile brake. An object of the invention is to provide a simple device which can be manufactured economically in large quantities, preferably by stamping or drawing from sheet steel.

In one desirable arrangement the device is built up by welding or otherwise securing together the flanges of two cup-shaped members having novel exteriorly-threaded coaxial bosses adapted, in the particular embodiment illustrated, to be threaded into the adjacent ends of the shoes or other parts which are to be adjustably connected. In this illustrated embodiment the two flanges serve to form a collar by means of which the device can be manipulated to make the adjustment.

Another feature of the invention relates to the arrangement of the brake, with the above-described device connecting the shoes at one side of the drum, and with a cam or the like between the ends of the shoes at the other side of the drum and preferably arranged to take the braking torque.

The above and other objects and features of the invention, including various novel combinations of parts and desirable particular constructions, will be apparent from the following description of one illustrative embodiment shown in the accompanying drawings, in which.

Figure 1:
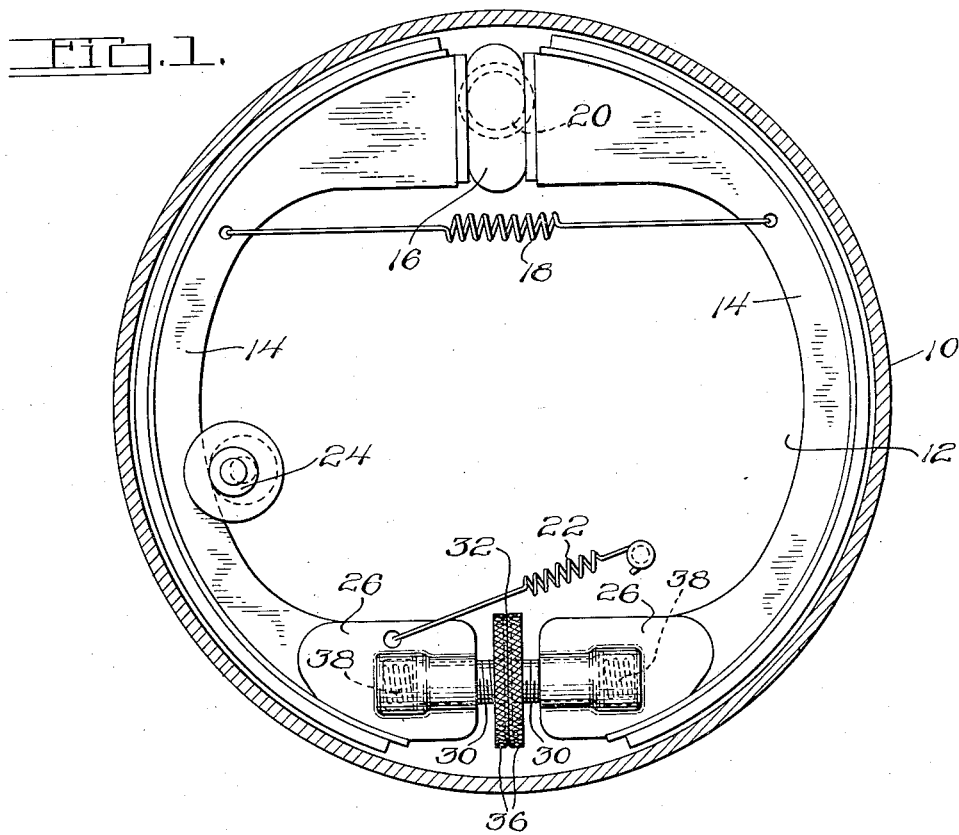
Figure 1 is a vertical section through the brake, just inside the head of the brake drum, showing the brake shoes in side elevation.
Figures 2, 3:
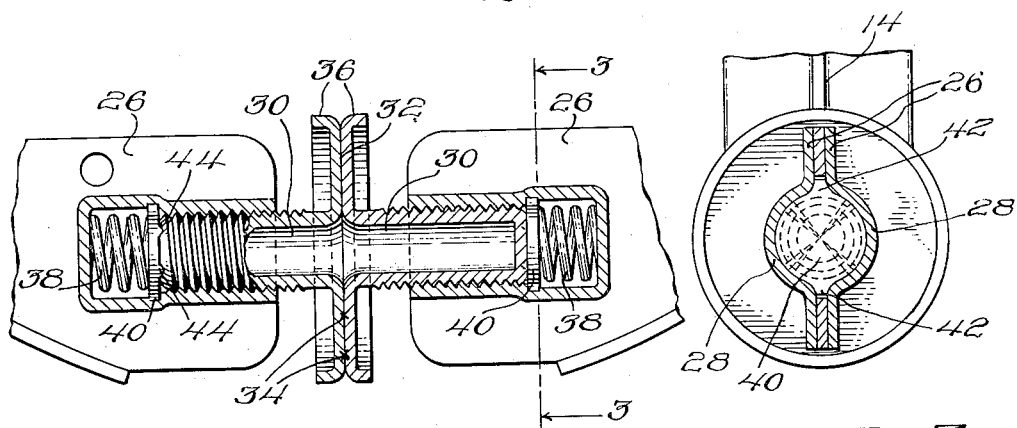
Figure 2 is a vertical section, on a larger scale, through the connecting device between the shoes of the brake.
Figure 3 is a section through the connecting device and one of the brake shoes, on the line 3—3 of Figure 2.

The illustrated brake includes a rotatable drum 10, at the open side of which is a support such as a backing plate 12, and within which is the friction means of the brake, which in this particular brake comprises interchangeable shoes 14 which are T-shaped in cross-section and have sufficient flexibility to be expanded into contact with the drum 10.

The brake is applied by means such as an asymmetric double cam 16, against the resistance of a return spring 18. Cam 16 may be integral with a camshaft 20 journaled in a bracket bolted to support 12, and preferably the cam also serves as an anchor to take the torque of the brake from one or the other of shoes 14. The cam is turned clockwise, in the arrangement shown, while the drum turns counterclockwise when the vehicle is moving forward. An auxiliary return spring 22 connected to the lower end of one of the shoes 14, and an adjustable eccentric stop 24 near the center of the front one of the shoes 14, co-operate with cam 16 and spring 18 in determining the idle position of the friction means.

At their lower ends, the shoes 14 are formed with coaxial threaded sockets, for example by cutting a slot lengthwise into the end of the stiffening web of each shoe, and projection-welding or otherwise securing to opposite sides of the web two pressed-steel plates 26 formed with semi-cylindrical half-sockets 28 stopping short of the outer ends of the plates. The socket so formed may be threaded, if desired, in any usual manner.

The shoes are shown adjustably connected by a novel device threaded into the sockets in the shoe ends. This device preferably comprises two cup-shaped elements, shown as having been drawn or stamped from sheet steel, which have exteriorly-threaded tubular coaxial bosses 30 received in the sockets. These elements also are shown with flanges 32 connected by spot-welds 34, or otherwise secured together, to form an outwardly-projecting collar by which the device can readily be turned. These flanges may be turned in opposite directions at the periphery to form a rim 36. Rim 36 may be ribbed or serrated as shown in Figure 1.

At the closed end of one or both of the above-described sockets, there may be confined a coil spring 38 compressed between the end of the socket and a pawl washer 40. Washer 40 is shown with ears 42 projecting into the slot in the shoe web between the plates 26, and is formed with one or more teeth 44 interlocking with teeth cut in the ends of bosses 30 to hold the adjusting device yieldingly against unintended turning. This locking means is the invention of Ludger E. LaBrie, and is claimed in his application No. 261,068, filed March 12, 1928.

While one illustrative embodiment has been described in detail, it is not my intention to limit its scope to that particular embodiment, otherwise than by the appended claims.

I claim:

1. A connecting device comprising two generally cup-shaped elements drawn from sheet metal and including flat flanges secured together to form a collar between the ends of the device and including exteriorly-threaded tubular coaxial bosses projecting in opposite directions from said collar.

2. A connecting device comprising two generally cup-shaped elements including flat flanges secured together to form a collar between the ends of the device and including exteriorly-threaded tubular coaxial bosses projecting in opposite directions from said collar.

3. A connecting device comprising two generally cup-shaped elements including flat flanges secured together to form a collar between the ends of the device and including exteriorly-threaded tubular coaxial bosses.

4. A connecting device comprising two generally cup-shaped elements including flat flanges secured together to form a collar and including exteriorly-threaded tubular coaxial bosses.

5. A connecting device comprising two generally cup-shaped elements including flat flanges secured together to form a collar and including exteriorly-threaded tubular coaxial bosses, the end of at least one of said bosses being formed with ratchet teeth.

6. A connecting device comprising two headed members oppositely positioned and having their heads permanently joined.

7. A connecting device comprising two headed members coaxially positioned and having their heads permanently joined.

8. A connecting device comprising two members having shanks and flanged heads permanently joined with their head flanges juxtaposed.

9. The method of forming a connecting device which comprises pressing cup-shaped members having tubular extensions and head flanges from sheet metal, permanently joining the heads of a pair of members and threading the tubular extensions.

In testimony whereof, I have hereunto signed my name.

DAVID L. GALLUP.